No. 650,155. Patented May 22, 1900.
D. W. PAYNE.
SALTER.
(Application filed Sept. 25, 1899.)
(No Model.)

WITNESSES:
Eli Staude
M. C. Norman

INVENTOR
DARIUS W. PAYNE
BY Paul Hawley.
HIS ATTORNEYS

UNITED STATES PATENT OFFICE.

DARIUS W. PAYNE, OF MINNEAPOLIS, MINNESOTA.

SALTER.

SPECIFICATION forming part of Letters Patent No. 650,155, dated May 22, 1900.

Application filed September 25, 1899. Serial No. 731,550. (No model.)

*To all whom it may concern:*

Be it known that I, DARIUS W. PAYNE, of Minneapolis, Hennepin county, Minnesota, have invented certain Improvements in Salters, of which the following is a specification.

This invention relates to improvements in salters designed especially for use in churns or butter-workers for salting the butter immediately after the churning process and before or while working; and the invention consists, generally in a suitable receptacle, preferably in the form of a drum, in which the butter is formed or in which it is placed, and a suitable salt-distributer arranged in said drum or receptacle and adapted to sift or sprinkle the salt evenly over the butter contained in said drum or receptacle.

The invention consists, further, in the constructions and combinations hereinafter described, and particularly pointed out in the claims.

Figure 1:
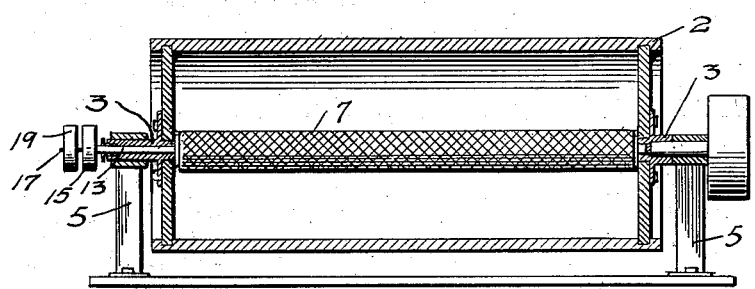
Figure 2:
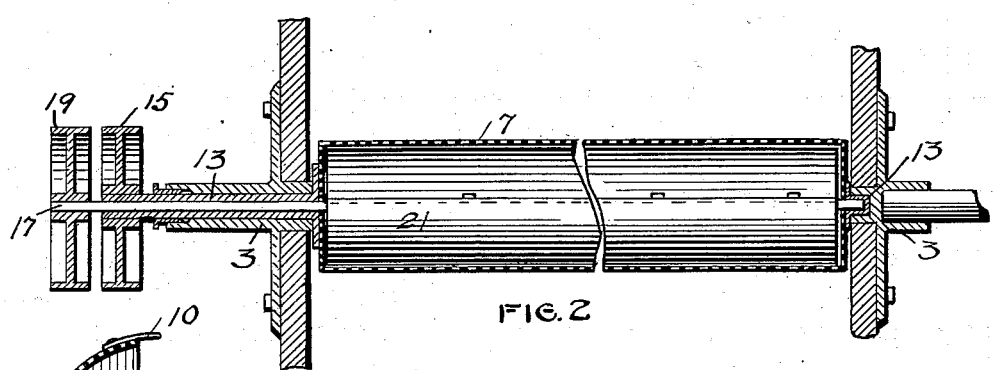
Figure 3:
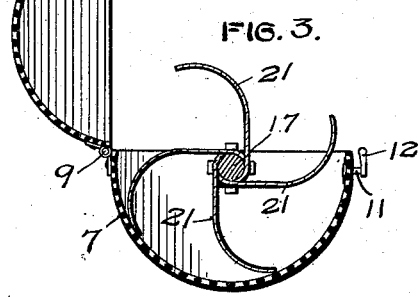
Figure 4:
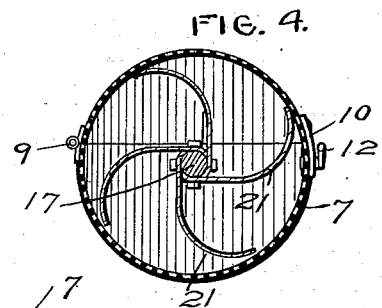
Figure 5:
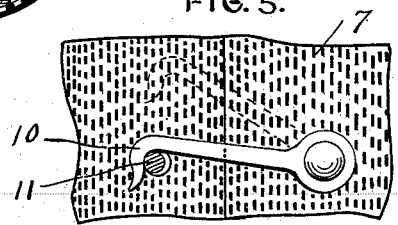
Figure 6:
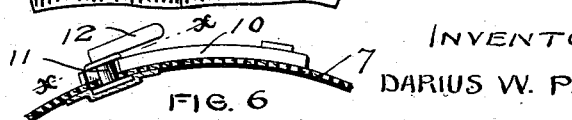

In the accompanying drawings, forming part of this specification, Figure 1 is a longitudinal section of a drum or receptacle, which may be the body of a churn or butter-worker, showing my salter arranged therein. Fig. 2 is a detail sectional elevation. Fig. 3 is a transverse section of the salter, showing the cylinder open. Fig. 4 is a similar view showing the cylinder closed. Figs. 5 and 6 are details showing the means for locking the two parts of the cylinder together.

In the drawings, 2 represents a suitable drum or receptacle, which may be of any suitable form, construction, or capacity. As here shown, the drum is mounted by means of gudgeons 3 upon suitable standards 5. This drum or receptacle may be the drum of a churn, butter-worker, or combined churn and butter-worker, and it may be mounted in any suitable frame provided with any suitable means for agitating the cream or working the butter and with any suitable means for driving it, or the drum or receptacle may be a receptacle of any suitable construction in which the butter is placed for the purpose of being salted. Arranged within the drum or receptacle 2 is a suitable perforated cylinder 7. As here shown, this cylinder consists of two parts hinged together at 9 and provided with suitable latches 10, pivoted upon one part of the cylinder near the meeting edge of the two parts and adapted to engage an eccentric stud 11 upon the other part of the cylinder. As here shown, the stud is provided with a handle 12, by means of which it may be rotated so as to draw the two parts of the cylinder closely together and lock them securely in this position. The cylinder 7, as here shown, is mounted upon the hollow gudgeons 13, which are in turn mounted in the gudgeons by which the drum or receptacle 2 is supported. One of the gudgeons 13 is preferably provided with a driving-pulley 15. Arranged to pass centrally through the cylinder 7 and through one of the gudgeons 13 is a shaft 17, provided with a driving-pulley 19. This shaft passes longitudinally and centrally through the cylinder 7 and has its bearings in the gudgeons 13. Arranged upon the shaft 17 are a series of blades or beaters 21. (See Figs. 3 and 4.) These are preferably curved spring-plates secured to the shaft and having their free edges extending quite close to the inner surface of the cylinder. The cylinder 7 is preferably formed of perforated sheet metal, as shown in the drawings, although, if preferred, it may be formed of wire-cloth or other suitable material. When in operation, both the cylinder and the central shaft may be rotated. They may be rotated in opposite directions or in the same direction at different rates of speed or either one may remain stationary while the other is rotating. The result is that the salt placed in the cylinder 7 will be evenly distributed over the butter contained in the drum or receptacle 2 before or while working.

Where the device in which the salter is placed is used in a churn, or a combined churn and butter-worker, it may be arranged so as to be removed from the drum during the churning operation or it may be left therein, as preferred. The cylinder of the salter is shown in the accompanying drawings as located centrally in the drum or receptacle 2. It need not, however, be thus located; but it may be supported by any suitable means in any suitable position within the drum or receptacle.

The details of construction of the cylinder and of the beaters located therein and of means for supporting and operating these parts may obviously be varied in many particulars without departing from my invention.

Having thus described my invention, I claim as new and desire to secure by Letters Patent—

1. The combination, with a revoluble butter-holding receptacle, of a perforated salt-distributing cylinder arranged within said receptacle, and means for supporting and operating said cylinder.

2. The combination, with a revoluble butter-holding receptacle, of a perforated cylinder, means for supporting said cylinder within said receptacle and means for rotating said cylinder.

3. The combination, with a revoluble butter-holding receptacle, of a perforated cylinder supported within said receptacle, beaters arranged within said cylinder, and means for operating said beaters.

4. The combination, with a revoluble butter-working drum, of a salt-distributer supported within said drum, and means for operating said distributer.

In testimony whereof I hereunto set my hand this 21st day of September, 1899.

DARIUS W. PAYNE.

In presence of—
A. C. PAUL,
A. F. HOLMES.